United States Patent [19]

Camerik

[11] 4,152,728

[45] May 1, 1979

[54] RELEASABLE CARRIAGE DRIVE UNIT FOR AN OPTICAL DISC PLAYER

[75] Inventor: Eduard Camerik, Eindhoven, Netherlands

[73] Assignee: U.S. Philips Corporation, New York, N.Y.

[21] Appl. No.: 905,856

[22] Filed: May 15, 1978

[30] Foreign Application Priority Data

Feb. 20, 1978 [NL] Netherlands .......................... 7801870

[51] Int. Cl.² .............................................. G11B 17/06
[52] U.S. Cl. ................................. 358/128; 274/23 A; 179/100.3 V
[58] Field of Search ................ 358/128; 179/100.3 V; 360/86, 107; 274/23 A

[56] References Cited

U.S. PATENT DOCUMENTS 3,977,684   8/1976   Camerik ........................... 358/128 X Primary Examiner—Bernard Konick
Assistant Examiner—Donald McElheny, Jr.
Attorney, Agent, or Firm—Thomas A. Briody; William J. Streeter; Simon L. Cohen

[57] ABSTRACT

An optical disc player comprises a read objective on a carriage which is translated to and fro with the aid of a drive unit with an electric motor by cooperation of a drive pinion and a gear rack, so that the read objective travels between a minimum diameter and a maximum diameter of the disc to be read, between which the information is contained. A pinion and a gear wheel of the drive unit cooperate with each other without play, in that the pinion is mounted on a pivoting member which is resiliently loaded, so that the pinion and the gear wheel are in resilient engagement with each other. During work on the optical disc player the pivoting member can be pivoted away by hand, so that the teeth of the pinion and the gear wheel are disengaged from each other so that a quick, practically unhampered translational movement of the carriage is possible.

7 Claims, 4 Drawing Figures

RELEASABLE CARRIAGE DRIVE UNIT FOR AN OPTICAL DISC PLAYER

BACKGROUND OF THE INVENTION

The invention relates to an optical disc player comprising a rotatable disc-spindle and a read objective which is arranged on a movable carriage for radial translational displacement of the objective relative to an optically readable disc, which is disposed on the disc spindle, between a minimum and a maximum radial distance between which the information to be read is contained on a disc. The invention comprises a drive unit for driving the carriage by cooperation of a drive pinion and a gear rack, which drive unit comprises: a frame; connected to the frame, an electric motor with a motor spindle which is rotatable about an axis of rotation; said drive pinion, which is rotatably journalled on the frame; a gear wheel which is coaxially connected to the drive pinion; and a primary pinion for driving the gear wheel.

The applicant's copending U.S. patent application Ser. No. 713,511 refers to a disc player of the type described above, the drive unit being mounted on a carriage which also accommodates a helium/neon laser, its high-voltage ignition unit, as well as a number of optical and electronic components, including the read objective. The rotatable disc spindle is constituted by the spindle of a main motor, which is mounted on a mounting plate manufactured from sheet steel. On said sheet-steel mounting plate two guide ways are mounted relative to which the carriage can move with the aid of roller bearings provided for this purpose. A gear rack for cooperation with the drive pinion is mounted on the mounting plate (see drawing).

Said drive unit should be of an inexpensive yet reliable construction, stringent requirements being imposed on the quality of the carriage drive. For a correct operation of an optical disc player of this type, it is essential that a light beam produced by the laser is continuously focussed with great accuracy on the very small information structure on the optically readable disc by the objective. For further information relating to an optically readable video disc and the equipment to be used for reading the information contained on said disc, reference is made to a number of articles in "Philips Technical Review" volume 33, 1973, no. 7, pp. 178-193, which relate to the Philips VLP system. In particular, it is of importance that there is no play between the various gear wheels of the drive unit or between the drive pinion and the gear rack. Play between these components could give rise to problems with the automatic correction of the position of the objective and thus of the carriage relative to the information track to be read on the video disc by means of an electronic control circuit provided for this purpose. Another requirement to be imposed on the drive unit is that it should not excessively hamper the to and fro movement of the carriage during work on the disc player, for example during manufacture or in the case of maintenance activities.

SUMMARY OF THE INVENTION

The invention provides a drive unit which meets the said requirements and is characterized in that the primary pinion is rotatably journalled on a pivoting member which is journalled on the frame and is pivotable to a limited extent about a pivoting axis between a swung-out position and an operating position, and that there are provided resilient means for resiliently loading the pivoting member towards its operating position, in which the primary pinion and the gear wheel resiliently engage with each other, which resilient means have such a spring constant that, first of all, for a quick translational displacement of the carriage during work on the disc player, the primary pinion can readily be disengaged from the gear wheel by hand by pivoting the pivoting member out of its operation position and that, secondly, in the event of the movement of the carriage being blocked, the pivoting member is swung out as a result of the forces acting between the teeth of the primary pinion and the teeth of the gear wheel, so as to prevent excessive mechanical loading of said teeth or any other parts of the disc player, or to prevent thermal overloading of said electric motor.

The resilient action of the pivoting member eliminates any play between the primary pinion and the gear wheel. The pivoting member can readily be shaped so that during the relevant activities the pivoting member can be held by hand and can be pivoted so as to disengage the teeth of the primary pinion and the gear wheel. Once these teeth are out of engagement, the carriage can freely be moved to an fro by hand any desired position.

Obviously, it is of importance that after a pivotal movement of the pivoting member, when it has been returned to its operating position, the correct drive relationship between the motor, via the primary pinion, and the other parts of the drive unit is restored. In this respect an embodiment is of interest which is characterized in that the pivoting member is pivotable about a pivoting axis which coincides with the axis of rotation of the motor spindle. When the pivoting member is pivoted the distance between the axis of rotation of the motor and the axis of rotation of a wheel which cooperates therewith is thus constant, independent of the pivotal position of the pivoting member.

Another possibility is presented by a further embodiment of the invention which is characterized in that said electric motor is mounted on the pivoting member. This embodiment also has the advantage that the designer has a greater degree of freedom in respect of the choice of the location of the pivoting axis of the pivoting member relative to the other parts of the drive unit. A further advantage is that deviations as a result of manufacturing and assembly tolerances in respect of the distance between the axis of rotation of the motor and the rotating components cooperating therewith can be smaller than in an embodiment in which the motor is disposed on a stationary part of the drive unit and the parts to be rotated thereby on a component which is movably journalled relative to the stationary part. This is because in the last-mentioned case the mounting and play of the movable part relative to the stationary part of the drive unit need be considered.

Suitably, use can be made of a further embodiment of the invention which is characterized in that the primary pinion is coaxially and rigidly connected to a pulley and that a flat elastic drive belt is arranged around the pulley and a cylindrical portion of the motor spindle for the transmission of the rotation of the motor spindle to the pulley. This embodiment is of importance for various reasons. In the first place the drive via the flat elastic belt ensures play-free cooperation between the motor and the primary pinion. Furthermore, the belt provides a significant degree of sound damping, in particular if it is necessary that the motor rotates with a comparatively high speed for a rapid movement of the carriage, for example after playing of a disc is terminated and the objective is to be returned to its initial position which is located nearer the drive spindle. When a drive belt is used no critical alignment is necessary of the motor relative to the axis of rotation of the wheel to which the rotation of the motor is directly transmitted. When gear wheels are used, accurate alignment is necessary, so as to avoid an excessive noise level. A further advantage is also that a belt drive enables slip between the belt and the motor spindle, so that the belt drive constitutes a second precaution against possible damage in the event that the movement of the carriage should be blocked.

For a play-free cooperation of the drive pinion with the gear rack a further embodiment is of interest, which is characterized in that the drive unit is bodily pivotable about a second pivoting axis and that there are provided a plurality of resilient means for bodily pivoting the drive unit through the resilient load, to a position in which the drive pinion and the gear rack are in play-free resilient engagement with each other with a force which is balanced with respect to said resilient load, and that there are furthermore provided retaining means for retaining the drive unit in the said position. The plurality of resilient means for exerting pressure on the pivoting member and for exerting pressure on the complete drive unit can be combined to a single resilient means.

In video disc players in accordance with the VLP system in a version for countries with the NTSC television standard and with a line frequency of 60 Hz, the nominal translation speed is 3 mm per minute and the maximum speed, for rapid movements of the carriage, is 300 mm per minute. An embodiment of the invention which provides a suitable adaptation of the drive unit to the said translation speed range, but which also provides a correct adaptation for video disc players intended for countries with the PAL television standard and with a mains frequency of 50 Hz, is characterized in that the electric motor is a d.c. motor with an ironless armature and a permanent-magnetic stator, and that the total transmission ratio (n) between the motor spindle and the drive pinion lies between N=200 and n=400. Motors of this type are commercially available in a satisfactory variety. For the construction of a suitable type of motor reference is for example made to the applicant's U.S. Pat. No. 3,8008,463. Such motors are suitable for use in cases that the difference between the minimum speed and maximum speed is substantial, while moreover they have a uniform speed of rotation at a low mass inertia of the rotary parts. In a drive unit realized by the applicant the motor speed is approximately 1½ revolution per second at the nominal speed of the carriage of 3 mm per minute, the maximum speed of the motor being a hundred fold thereof, i.e., 150 revolutions per second.

A simple construction of the drive unit can be achieved by using a further embodiment of the invention which is characterized in that the frame for journalling the pivoting member has an aperture for the passage of a cylindrical pivoting portion of the pivoting member in the direction of the pivoting axis when said member is in the swung-out position and the pivoting member and the frame are provided with projections and recesses so as to prevent a displacement relative to each other in the direction of the pivoting axis when the pivoting member is in its operating position. This enables simple and rapid mounting of the pivoting member.

BRIEF DESCRIPTION OF THE DRAWINGS

The invention will now be described in more detail with reference to the drawing, while moreover further steps will be discussed which can be taken to obtain a rapid and simple assembly of a drive unit in accordance with the invention, and in which.

DESCRIPTION OF THE PREFERRED EMBODIMENTS

Figure 1:
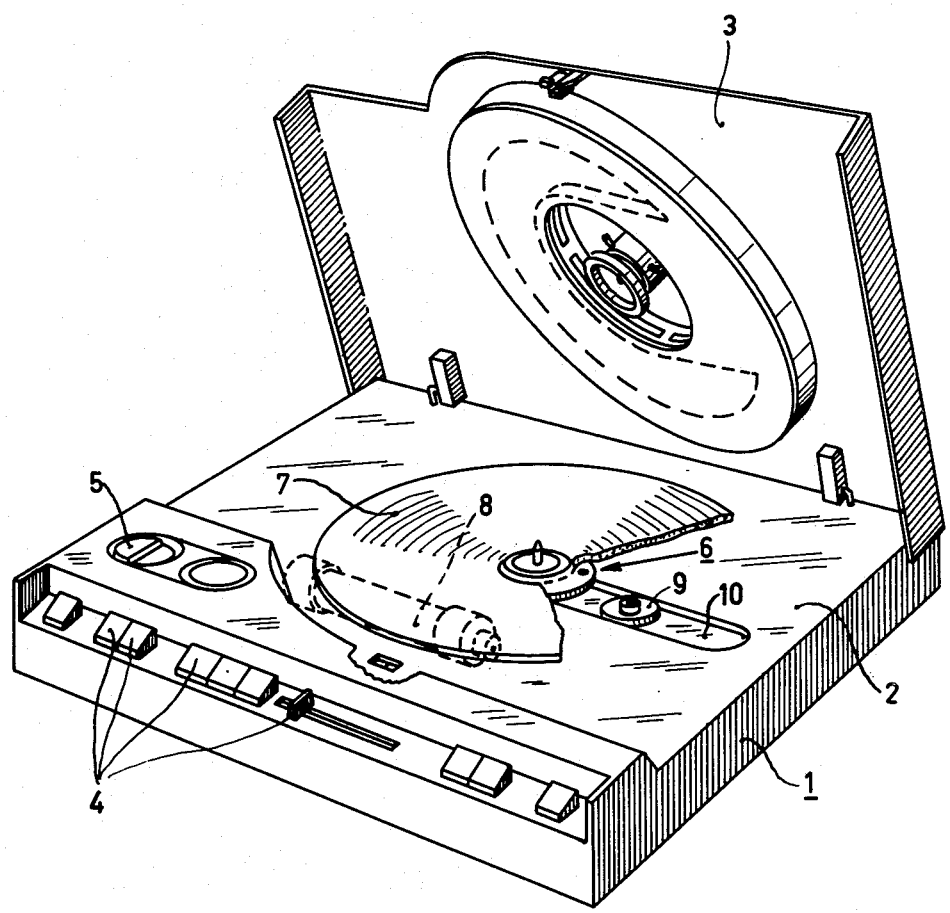
FIG. 1 is a schematic perspective view of a video disc player with opened cover and with a video disc placed in position.

In the various Figures corresponding parts bear corresponding reference numerals.

The video disc player in accordance with FIG. 1 comprises a housing 1 whose top side is constituted by a deck 2 to which a cover 3 is hingeably secured. At the front of the apparatus a number of controls 4 are disposed for controlling the various apparatus functions, as well as a switching button 5. On a rotatable disc spindle 6 there is disposed a video disc 7 which contains optically readable recording tracks which can be read on the disc side which faces the deck 2. For reading there is provided a helium/neon laser 8, underneath of the deck 2 in the housing 1, which can produce a radiation beam, not shown. The laser beam is projected to a read unit which inter alia comprises a read objective 9, which is movable in a slot 10 in the deck 2 in the radial direction relative to the disc spindle 6. The read objective 9 focusses the read beam on the video disc 7 and is secured to a carriage underneath the deck 2, which carriage is radially movable relative to the rotatable disc spindle 6.

Figure 2:
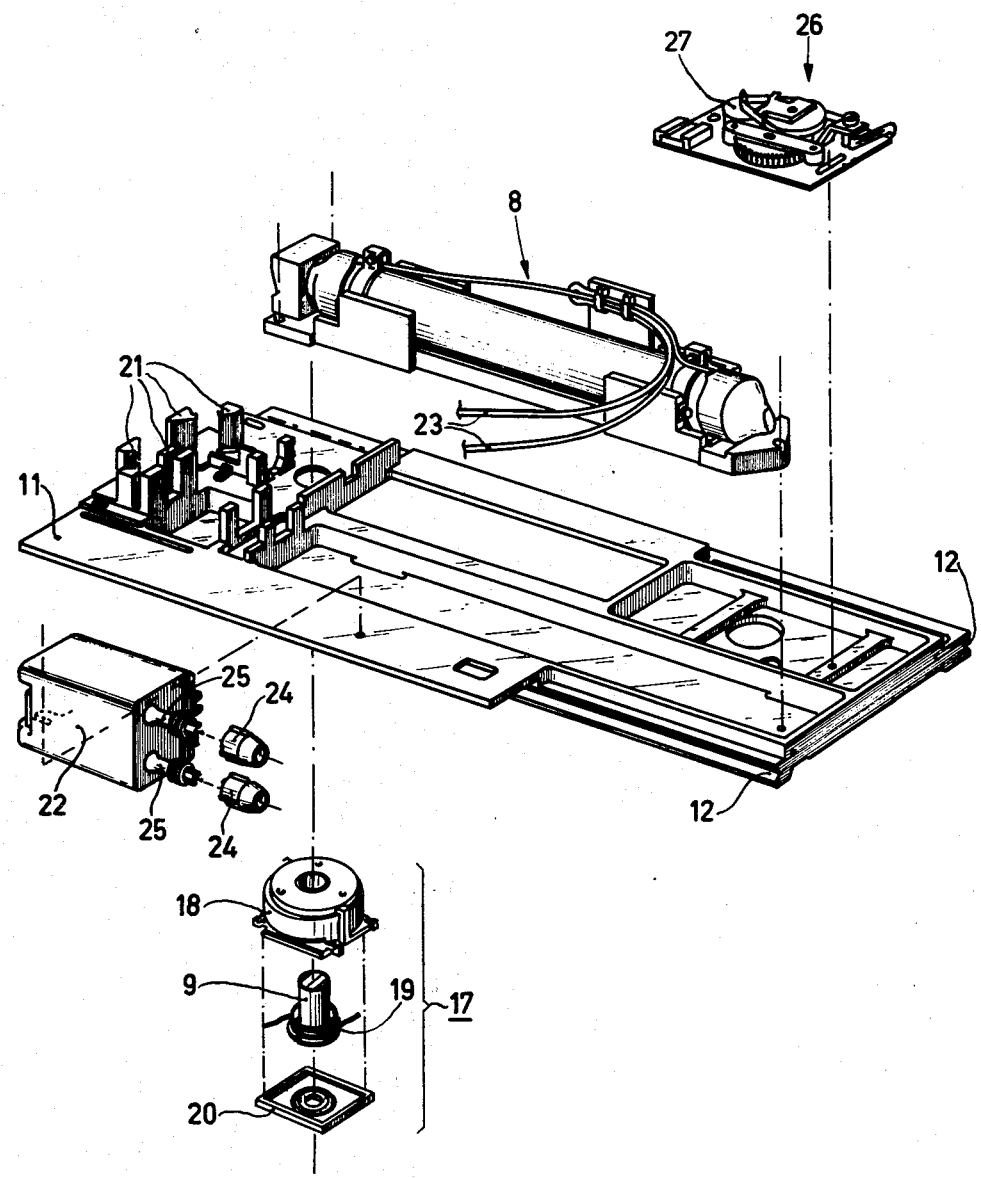
FIG. 2 represents an exploded view of a carriage which accommodates a helium/neon gas laser as well as some other components.
Figure 3:
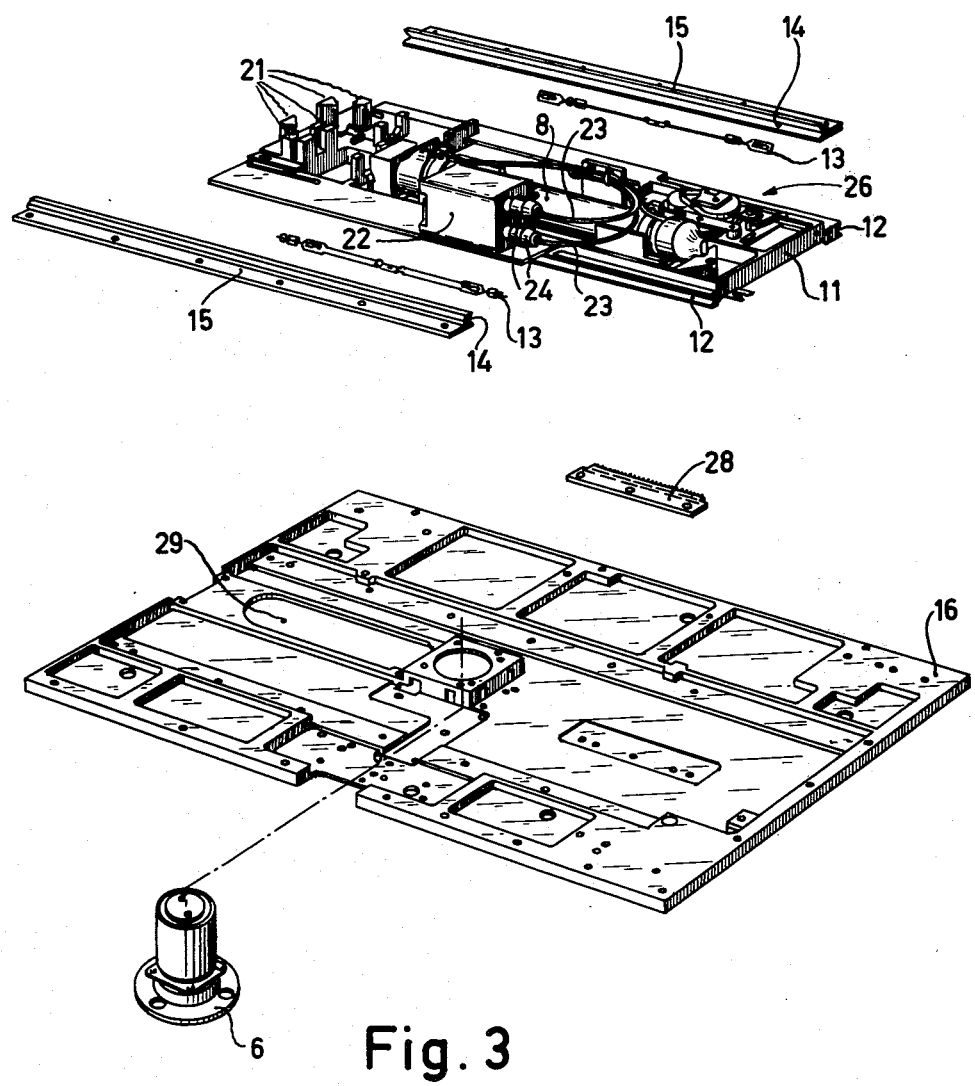
FIG. 3 shows the assembly of the carriage of FIG. 2 and the associated parts in an exploded view of a mounting unit with a mounting plate.

FIG. 2 shows said carriage at the underside, designated by the reference numeral 11. The carriage is integrally manufactured from a metal and has V-shaped guide grooves 12 at its sides, which grooves cooperate with roller bearings 13, see FIG. 3. These roller bearings have rollers which, apart from in the guide grooves 12, run in guide grooves 14 of the guide ways 15 which are rigidly mounted on a sheet metal mounting plate 16, which is located underneath the deck 2 of the video disc player and which is rigidly connected to the housing 1.

Of the optical elements which are secured to the carriage 11 only the read objective 9 is shown. FIG. 2 shows that the read objective belongs to a focussing device 17, which in addition to the read objective 9 comprises an objective frame 19 which accommodates an annular permanent magnet which, for controlling the read objective 9, cooperates with a coil 19 which is mounted on the read objective, as well as a rubber cap 20.

The other optical elements which are required are mounted on the supports 21 on the slide 11, but are not shown for the sake of simplicity and are further irrelevant for the present invention. A laser beam which emerges from the laser follows a substantially U-shaped path before it is deflected 90° in the direction of the focussing device 17.

The laser is mounted on the carriage by suitable means, such as screws, in a fixed relationship relative to the fixed supports 21 and thus also relative to those optical elements which are rigidly connected to the carriage with the aid of the supports.

For the ignition of the laser there is provided a high-voltage ignition device 22. This device is also mounted on the carriage 11 by means of screws and is connected to the laser 8 by means of two insulated wires 23. For this purpose the wires 23 are passed through threaded caps 24 which can be fitted onto the hollow support 25, so that the high voltage wires 23 are firmly coupled to the ignition device 22.

Mounted on the carriage 11 is a drive unit 26 for moving the carriage underneath the mounting plate 16. This unit comprises a frame in the form of a base plate 32 and furthermore comprises an electric motor 27. With the aid of the motor 27 the carriage 11 is bodily movable to and fro relative to the mounting plate 16, the focussing device 17 moving to and fro in a slot 29 in the mounting plate 16. During these movements the laser 8 remains in the same position relative to the supports 21 on the carriage 11 and thus relative to the optical elements, not shown, which are rigidly mounted on said supports. The high-voltage wires 23 perform no relative movements with respect to the high-voltage ignition device 22. Obviously, this ignition device as well as the electrical means for controlling the objective and the other movable optical elements and the motor 27 should continuously be connected electrically to the other electrical means which are in fixed positions within the housing 1 of the video disc player. The connecting wires should be able to follow the relative movement of the carriage 11 with respect to the mounting plate 16, but this is safer for such wires, which carry a low voltage.

Figure 4:
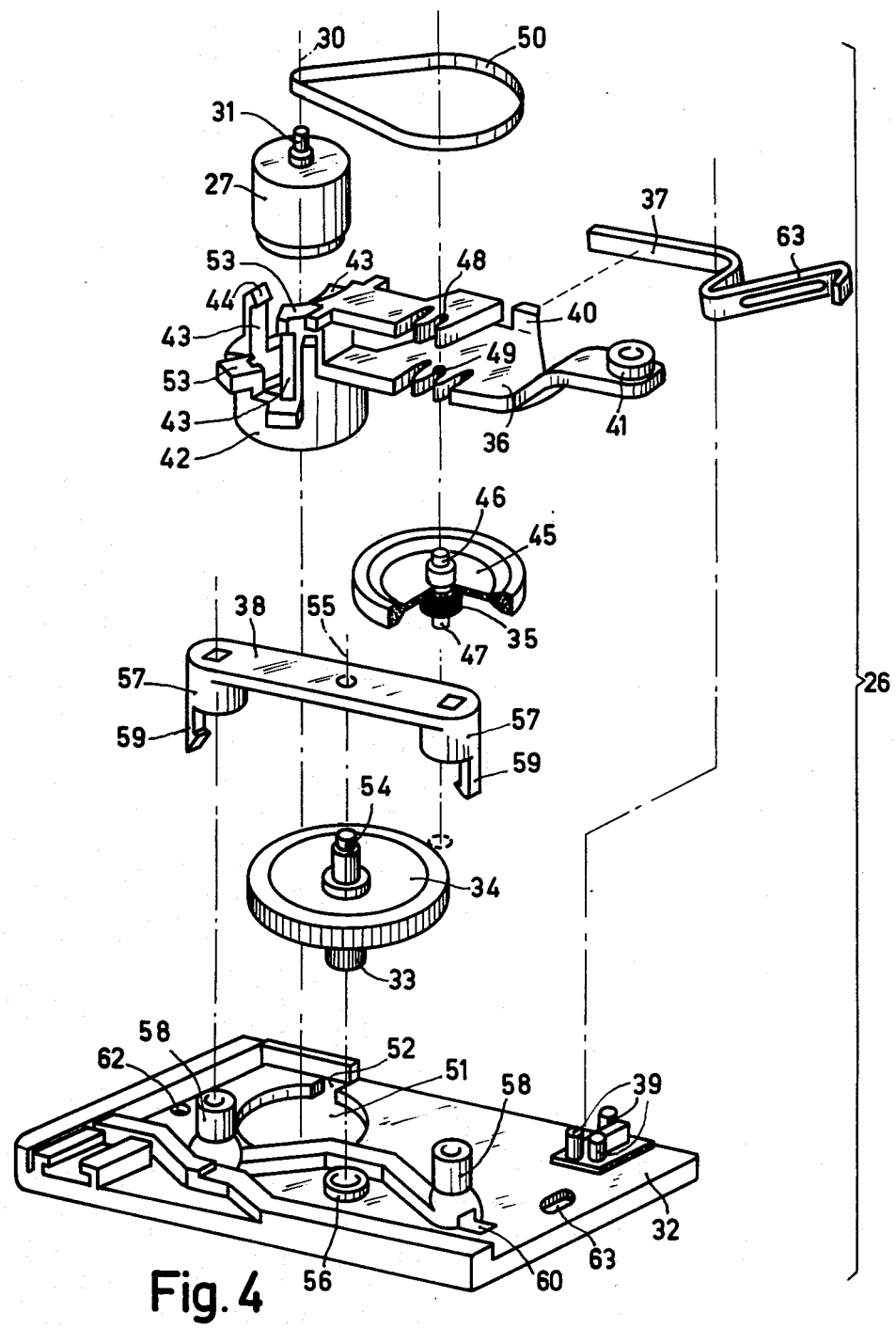
FIG. 4 is an exploded view of a drive unit for the carriage which is also shown in FIG. 2 and 3.

As is shown in FIG. 4, the drive unit 26, in addition to the base plate 32 with the motor 27 mounted thereon, comprises some further components, i.e., a drive pinion 33 havig eight teeth, a gear wheel 34 which is coaxially connected to the drive pinion 33, and a primary pinion 35 for driving the gear wheel 34. The primary pinion 35 is rotatably journalled on a pivoting member in the form of a pivoting bracket 36, which is journalled on the base plate 32 and which is pivotable to a limited extent between a swung-out position and an operating position, about a pivoting axis which coincides with the axis of rotation 30 of the motor spindle 31. A curved leaf spring 37 biases the pivoting bracket 36 towards its operating position, in which position the primary pinion 35 and the gear wheel 24 are resiliently pressed against each other by the leaf spring 37. The pivoting bracket 36, the base plate 32, a bearing bracket 38 as well as the various wheels and pinions of the drive unit 26 have all been manufactured from a suitable thermoplastic material by injection moulding.

On the base plate 32 three cams 39 are formed between which the curved portion of the leaf spring 37 can be fitted and which take up the reaction forces exerted on the leaf spring. On the pivoting bracket 36 a cam 40 is formed with which the leaf spring 37 cooperates for the transmission of the pressure to the pivoting bracket. The spring 37 has such a shape and is made of such a material that the spring constant of the portion of the spring 37 which cooperates with the pivoting bracket 36 is such that the pivoting bracket can readily be pivoted by exerting manual pressure, preferably with the thumb only, on an extended actuating portion 41 of the pivoting bracket, so that the pivoting bracket pivots out of its operating position towards a more swung-out position. Subsequently, the carriage can be moved to and fro without being significantly hampered, because the primary pinion 35 is out of engagement with the gear wheel 34 and thus only the assembly consisting of the drive pinion 33 and the gear wheel 34, which is coaxially connected thereto, is driven during the to-and-fro movement. Furthermore the said spring constant is such that in the event of the movement of the carriage 11 being blocked the pivoting bracket 36 is pivoted in the direction of its swung-out position owing to the forces acting between the teeth of the primary pinion 35 and the teeth of the gear wheel 37, so as to prevent excessive mechanical loading of said teeth or of any other parts of the disc player, such as the teeth of the drive pinion 33 and the gear rack 28. Moreover, it prevents the motor 27 from being electrically overloaded.

As previously stated, the pivoting axis of the pivoting bracket 36 coincides with the axis of rotation 30 of the motor spindle 31. The motor is mounted on the pivoting bracket 36. For this purpose the pivoting bracket is provided with a cylindrical motor holder 42 and three resilient tabs 43, which at their ends are provided with retaining cams 44. The resilient tabs 43 are spaced at such a distance from each other and have such a length that the cylindrical motor housing 27 fits between the resilient tabs and the motor can simply be mounted in the motor holder by pressing the motor into it in the direction of the axis of rotation. The motor is axially retained by means of the retaining cams 44, which after the resilient tabs 43 have initially been bent outwards snap back over the axial end of the housing of the motor 27, The primary pinion 35 is coaxially and rigidly connected to a pulley 45. The assembly consisting of the primary pinion and the pulley 45 is provided with trunnions 46 and 47 on both sides. The pivoting bracket 36 is provided with bearing recesses 48 and 49 corresponding to the trunnions 46 and 47, in which recesses slots terminate so as to facilitate mounting said assembly in the radial direction by deformation of the slot walls. A flat elastic drive belt 50 is fitted around the pulley 45 and the motor spindle 31 for imparting the rotation of the motor spindle to the pulley.

For journalling the pivoting bracket 36 a bearing aperture 51 is formed in the base plate 32. The cylindrical motor holder 42 of the pivoting bracket 36 fits into said aperture so that in this way a pivotal bearing for the pivoting bracket is obtained. The cylindrical motor holder 42 thus also functions as cylindrical pivoting member for the pivoting bracket 36. In the more swung-out position of the pivoting bracket 36 this member can be passed through the aperture 51 in the base plate 32. The aperture 51 has three circumferential recesses 52, one of said recesses being shown in the drawing. The cylindrical motor holder 42 has three projections which correspond to the recesses 52 in respect of their position and dimensions, two of said projections being visible in the drawing. When the cylindrical motor holder 42 is passed through the base plate 32, the projections 53 pass through the recesses 52, until the bracket is positioned on the base plate 32. The projections 53 are then located at the side of the base plate 32 which faces the pivoting bracket. After the pivoting bracket has been pivoted to its operating position, the projection 53, together with the portions of the base plate 32 surrounding the aperture 51 prevent the pivoting bracket 36 and the base plate 32 from being moved relative to each other in the direction of the pivoting axis 30.

The drive pinion 33 and the gear wheel 34 together constitute a single unit manufactured from a plastic, which is provided with a trunnion 54 which enables it to be journalled in a bearing aperture 55 of the bearing bracket 38. On the opposite side of the gear wheel 34 the assembly is journalled in a bearing aperture 56 in the base plate 32. The bearing bracket 38 is provided with hollow portions 57 on both ends, which can engage with two mounting supports 58 of the base plate 32. For affixing the bearing bracket 38 relative to the base plate 32 a pair of resilient hooks 59 are provided, which are passed through mounting apertures 60 (of which only one is visible in FIG. 4) formed in the base plate 32 near the mounting supports 58, so that a quick and simple snapped connection of the bearing bracket 38 to the base plate 32 is possible.

The drive unit shown can be assembled quickly and without the use of tools and separate fixing means from components which are generally injection-moulded. The assembly is pivotable relative to the carriage 11 about a second pivoting axis 51. A through-going aperture 62 in the base plate 32 serves for taking up a pin, not shown, which projects from the carriage 11. A hook-shaped portion 63 of the leaf spring 37 presses against an upright portion of the carriage 11 when the drive unit is mounted on the carriage 11 (see FIG. 3), so as to pivot the complete drive unit through the resilient loading into a position in which the drive pinion 33 and the gear rack 28 are in play-free resilient engagement with each other with a force which is balanced with respect to the resilient portion 63. In this situation the unit is secured to the carriage 11 with the aid of a suitable fixation means such as a screw, which is passed through a slotted aperture 63 in the base plate 32. Thus, quick mounting of the drive unit 63 on the slide 11 is possible, whilst always a specific previously calculated initial pressure exist between the drive pinion 33 and the gear rack 28.

What is claimed is:

1. An optical disc player comprising a rotatable disc spindle and a read objective which is arranged on a movable carriage for radial translational displacement of the objective relative to an optically readable disc which is disposed on the disc spindle between a minimum and a maximum radial distance between which the information to be read is contained on a disc, and comprising a drive unit for driving the carriage by cooperation of a drive pinion and a gear rack, which drive unit comprises:

connected to the frame, an electric motor with a motor spindle which is rotatable about an axis of rotation, said drive pinion being rotatably journalled on the frame, a gear wheel coaxially connected to the drive pinion, and a primary pinion for driving the gear wheel, the primary pinion being rotatably journalled on a pivoting member which is journalled on the frame and is pivotable to a limited extent about a pivoting axis between a swung-out position and an operating position, resilient means for resiliently loading the pivoting member towards its operating position, in which the primary pinion and the gear wheel being in resilient engagement with each other, which resilient means have such a spring constant that, for a quick translational displacement of the carriage during work on the disc player the primary pinion can readily be disengaged from the gear wheel by hand by pivoting the pivoting member out of its operating position and that, in the event of the movement of the carriage being blocked, the pivoting member is swung-out as a result of the forces acting between the teeth of the primary pinion and the teeth of the gear wheel, so as to prevent excessive mechanical loading of said teeth or any other parts of the disc player, or to prevent thermal overloading of said electric motor.

2. An optical disc player as claimed in claim 1, wherein the pivoting member is pivotable about a pivoting axis which coincides with the axis of rotation of the motor spindle.

3. A disc player as claimed in claim 1, wherein said electric motor is mounted on the pivoting member.

4. An optical disc player as claimed in claim 1, wherein the primary pinion is coaxially and rigidly connected to a pulley, and that a flat elastic drive belt is fitted around the pulley and the cylindrical portion of the motor spindle for transmitting the rotation of the motor spindle to the pulley.

5. An optical disc player as claimed in claim 1, wherein the drive unit is bodily pivotable about a second pivoting axis and there are provided resilient means for bodily pivoting the drive unit through the resilient load, into a position in which the drive pinion and the gear rack are in play-free resilient engagement with each other with a force which is balanced with respect to said resilient load, and that there are furthermore provided retaining means for retaining the drive unit in the said position.

6. An optical disc player as claimed in claim 1, wherein the electric motor is a d.c. motor with an ironless armature and a permanent magnetic stator, and that the total transmission ratio n between the motor spindle and the drive pinion lies between $n=200$ and $n=400$.

7. An optical disc player as claimed in claim 1, wherein the frame for journalling the pivoting member has an aperture for the passage of a cylindrical pivoting portion of the pivoting member in the direction of the pivoting axis when said member is in the swung-out position, and the pivoting member and the frame are provided with projections and recesses so as to prevent a displacement relative to each other in the direction of the pivoting axis when the pivoting member is in its operating position.

* * * * *